Patented Mar. 28, 1939

2,152,248

UNITED STATES PATENT OFFICE 2,152,248

TRIHEXOSAN-CARBOXYLIC ACID SALTS AND PROCESS OF MAKING SAME

Marja Finkelsztejn, Paris, France, assignor, by mesne assignments, to the firm of Chemical Works formerly Sandoz, Basel, Switzerland No Drawing. Application November 16, 1936, Serial No. 111,177. In Switzerland November 21, 1935

20 Claims. (Cl. 260—528)

This invention is based on the observation that by oxidation of trihexosan in alkaline solution there may be obtained in good yield well defined salts of hitherto unknown polyhydroxycarboxylic acids. It is immaterial whether the parent material is made by heating starch with glycerine as described by Pictet and Jahn, by the fermentative degradation prescribed by Pringsheim or by depolymerisation of starch by means of water under pressure. Small quantities of glucose which are still present may be separated by fermentation. The trihexosan is advantageously oxidised in an aqueous solution in the presence of alkali for example by means of permanganate, halogen, a hypohalite or hydrogen peroxide. Correspondingly with the proportion of the oxidizing agent there are poduced salts of mono- or di-carboxylic acids or a mixture thereof. The new carboxylic acids may be separated from the solution in which the oxidation has occurred by precipitation in the form of their basic barium salts which are very sparingly soluble in water and from these salts other salts, and also the free polycarboxylic acids, may be obtained by known methods.

Most of the salts of the carboxylic acids are highly soluble in water but not deliquescent. For example, the neutral salts of the alkaline earths, iron, copper, manganese, nickel and silver dissolve in their own weight of water and on evaporation remain in the form of transparent, pulverulent varnishes. Addition of alkali solution does not produce a precipitate in solutions of the salts of the heavy metals. The aqueous solutions, for instance those of the calcium salts, are capable of injection without disturbance and are well tolerated. They may be sterilized by heat without change. The salts reduce Fehling's solution only in small degree on prolonged boiling of their aqueous solutions, but after hydrolysis with N-hydrochloric acid reduction occurs immediately on heating. Yeast does not attack the salts in aqueous solution, but if the solutions are first heated with acid, fermentation will occur.

The free acids are white substances, soluble in water in every proportion. On standing their aqueous solutions undergo hydrolysis while splitting off glucose. The strength of the acids rapidly diminishes when they are stored in solid form, obviously in consequence of the formation of anhydride or of a lactone form.

The new compounds are useful in therapeutics.

The following examples illustrate the invention, the parts being by weight:—

Example 1

100 parts of trihexosan and 15 parts of sodium hydroxide are dissolved together in 1200 parts of water and to the solution in a ball-mill is added in one batch 85 parts of potassium permanganate. The mass, which soon becomes a jelly, is ground until the temperature, which at first rises somewhat, has fallen and the manganese mud has flocculated. This mud is then filtered and washed. The nearly colorless solution is now mixed with baryta water so long as a precipitate is formed. The latter is filtered and washed with water containing baryta. It is then made into a thin magma with water and acetic acid is added until the pH-value=6.5. The precipitate dissolves, with the exception of impurities, which are filtered; the neutral barium salt of the dicarboxylic acid from trihexosan is separated from the filtrate by addition of alcohol to the amount of 3 times the volume of the filtrate. After filtration and drying this product is a white to yellowish white powder. It dissolves in its own weight of water to a clear solution without application of heat, but it is not deliquescent. The aqueous solution is neutral. The barium content of the dry neutral salt amounts to 20.9 per cent.

Instead of potassium permanganate there may just as well be used another permanganate.

Example 2

100 parts of trihexosan are oxidized as described in Example 1 by means of permanganate and the basic barium salt, insoluble in water, is separated. The salt is then rubbed with sufficient dilute sulfuric acid to convert the barium into sulfate. The mass is then neutralised with milk of lime, filtered and from the filtrate the neutral calcium salt of the dicarboxylic acid is precipitated by adding alcohol to the amount of three times the volume of the filtrate.

The anhydrous calcium salt of the dicarboxylic acid is a white powder which absorbs water from the air up to a content of 6–7 per cent. and then remains unchanged. The calcium content of the dry salt is 7.1 per cent. The salt dissolves in its own weight of distilled water immediately and remains on evaporation of the solution in the form of a transparent varnish.

The aqueous solution is almost tasteless.

Example 3

To a solution of 100 parts of trihexosan in 400 parts of water and 400 parts of caustic soda solution of 4 per cent. strength there are dropped, while stirring, in the course of 30 minutes, 60 grams of bromine. When the reaction is at an end the yellow solution is mixed with an excess of baryta water, the basic barium salt is filtered and thoroughly washed. From the barium salt the neutral calcium salt is made as described in Example 2.

Instead of the hypohalite formed from bromine and caustic soda solution there may for example also be used chlorite of lime.

Example 4

35 parts of the neutral barium salt of the dicarboxylic acid made as described in Example 1 are dissolved in 100 parts of water and the barium is precipitated by addition of the calculated quantity of sulfuric acid. The solution is neutralized by means of powdered magnesium oxide, filtered from barium sulfate and the magnesium salt of the dicarboxylic acid is precipitated by adding alcohol amounting to 5 times the volume of the liquor. After filtering and drying, the magnesium salt is a powder and is extremely soluble in water but not deliquescent. Its magnesium content is 4.5 per cent. Its aqueous solution dissolves magnesia shaken therewith and there is produced a basic salt, soluble in water.

Example 5

100 parts of trihexosan are dissolved in 1200 parts of water, 120 parts of caustic soda solution of 4 per cent. strength are added and, while stirring, 40 parts of powdered potassium permanganate are added in the course of 20 minutes. Stirring is continued for 2 hours and the whole is allowed to stand for 24 hours. After separating the manganese hydroxide, baryta is added in excess to the solution and the precipitated basic barium salt is filtered and then well washed. It is rubbed with sufficient sulfuric acid to produce a solution of pH-value=7. There is now added a concentrated solution of ferrous-sulfate until the barium is completely precipitated, whereupon the mass is filtered and the greenish solution of the ferrous salt mixed with 5 times its volume of alcohol, whereupon the said salt is precipitated. This ferrous salt of the mono-carboxylic acid from trihexosan is a yellowish powder having a content of iron of 5.3 per cent. It is freely soluble in water. The aqueous green solution has a slightly sweet taste.

Example 6

30 parts of the neutral barium salt of the dicarboxylic acid from trihexosan, obtained as described in Example 1, are dissolved in 150 parts of water. To the solution there is added one of pure ferrous sulfate until no barium can be detected in the solution. The barium sulfate is filtered and the filtrate is stirred with 4–5 times its volume of alcohol; the greenish precipitate thus produced is filtered and dried, preferably in a vacuum. It is then a yellowish powder, very easily soluble in water, for instance in the proportion 1:1, to a greenish-yellow solution, which is neutral and tastes slightly sweet. The dry salt contains 9.3 per cent. of iron.

Example 7

A solution of 50 parts of trihexosan in 600 parts of water is oxidized by addition of 60 parts of caustic soda solution of 4 per cent. strength, together with 20 parts of sodium permanganate. The manganese precipitate is filtered and the solution is precipitated by means of an excess of baryta water. The basic barium salt is filtered, washed and again dissolved by addition of sulfuric acid until the reaction is neutral. A copper sulfate solution is now added to the filtrate until the barium is completely precipitated in the form of sulfate. The copper salt of the mono-carboxylic acid from trihexosan is precipitated from the filtrate by addition of alcohol amounting to 4 times the volume of the liquor. The filtered precipitate is dried, whereupon it forms a bluish powder. It is very freely soluble in water; caustic soda solution or caustic potash does not produce any precipitate of copper hydroxide in the solution.

Example 8

100 parts of trihexosan are dissolved in 1200 parts of water, 120 parts of caustic soda solution of 4 per cent. strength are added and, in the course of 20 minutes, 40 parts of potassium permanganate are introduced, while stirring. The whole is further stirred for 2 hours and then allowed to stand for 24 hours. After filtering the flocculated manganese hydroxide the filtrate is neutralized with hydrochloric acid and evaporated to 200 parts by volume in a vacuum. Hydrochloric acid is then added until, the pH-value is 3.5, and the carboxylic acid which has been produced is precipitated by addition of alcohol amounting to 5 times the volume of the liquor. By filtration, resolution in a small quantity of water and precipitation with alcohol of 5 times the volume of the water there is obtained the mono-carboxylic acid in the form of a white, loose, crystalline powder.

Example 9

100 parts of trihexosan and 15 parts of sodium hydroxide are dissolved in 1200 parts of water and, preferably in a ball mill, 85 parts of potassium permanganate are added to the solution in a single batch. The mass soon becomes a jelly, whereupon it is ground until the temperature, which at first rises, has fallen and the manganese mud is flocculated. The mud is separated and washed. The nearly colorless solution is mixed with baryta water so long as a precipitate is produced; the latter is filtered and washed with water containing baryta. It is then rubbed with sulfuric acid of 25 per cent. strength, sufficient to precipitate the whole of the barium, and the barium sulfate is then filtered. By stirring the filtrate in 10 times its volume of absolute alcohol the dicarboxylic acid from trihexosan is precipitated in the form of white flocks.

Example 10

200 parts of trihexosan are dissolved in 800 parts of water. 200 parts of caustic soda solution of 10 per cent. strength and 100 parts of hydrogen peroxide solution of about 30 per cent. strength are added and the whole is allowed to stand for three days. On addition of barium hydroxide in excess there is now formed a strong precipitate of basic barium salt, from which the neutral barium salt of the dicarboxylic acid from trihexosan can be obtained as described in Examples 1 and 2.

Example 11

100 parts of trihexosan are dissolved in 1200 parts of water, 5 parts of milk of lime of 20 per cent. strength are added thereto, and 55 to 60 parts of chloride of lime introduced into this mixture. The whole is stirred until active chlorine can no longer be detected in the solution. The basic calcium salt of the trihexosan-monocarboxylic acid is precipitated from the clearly filtered solution by an excess of milk of lime. It is filtered and thoroughly washed out. By dissolution in dilute acetic acid and precipitation with 2½ parts by volume of alcohol, the neutral calcium salt of trihexosan-mono-carboxylic acid is obtained therefrom in the form of a white powder which is very easily soluble in water and has a calcium content of 3.8 per cent.

What I claim is:—

1. Process for the manufacture of metal salts of trihexosan-carboxylic acids, comprising treating trihexosan in alkaline solution with an oxidizing agent.

2. Process for the manufacture of metal salts of trihexosan-carboxylic acids, comprising treating trihexosan in alkaline solution with that quantity of an oxidizing agent which is necessary for the formation of one carboxyl group.

3. Process for the manufacture of metal salts of trihexosan-carboxylic acids, comprising treating trihexosan in alkaline solution with at least that quantity of an oxidizing agent which is necessary for the formation of two carboxyl groups.

4. A process as claimed in claim 1, in which a permanganate is used as oxidizing agent.

5. A process as claimed in claim 1, in which halogen is used as oxidizing agent.

6. A process as claimed in claim 1, in which a salt of hypochlorous acid is used as oxidizing agent.

7. Process for the manufacture of a metal salt of the trihexosan-carboxylic acids, comprising treating trihexosan in alkaline solution with an oxidizing agent and separating the trihexosan carboxylic acid thus produced in the form of a metal salt.

8. Process for the manufacture of a metal salt of the trihexosan-carboxylic acids, comprising treating trihexosan in alkaline solution with an oxidizing agent and separating the trihexosan-carboxylic acid thus produced in the form of a sparingly soluble metal salt.

9. Process for the manufacture of a metal salt of the trihexosan-carboxylic acids, comprising treating trihexosan in alkaline solution with an oxidizing agent and separating the trihexosan-carboxylic acid thus produced in the form of an easily soluble metal salt.

10. Process for the manufacture of a salt of the trihexosan-carboxylic acids, comprising treating trihexosan in alkaline solution with an oxidizing agent and separating the trihexosan-carboxylic acid thus produced in the form of its sparingly soluble basic barium salt.

11. Process for the manufacture of a salt of the trihexosan-carboxylic acids, comprising treating trihexosan in alkaline solution with an oxidizing agent and separating the trihexosan-carboxylic acid thus produced in the form of its easily soluble neutral calcium salt.

12. Process for the manufacture of a salt of the trihexosan-carboxylic acids, comprising treating trihexosan in alkaline solution with an oxidizing agent, separating the trihexosan-carboxylic acid thus produced in the form of its sparingly soluble basic barium salt, redissolving said salt with an acid, and separating the trihexosan-carboxylic acid in the form of the easily soluble neutral calcium salt.

13. Process for the manufacture of the calcium salt of trihexosan-dicarboxylic acid, comprising treating trihexosan in alkaline solution with that quantity of an oxidizing agent which is necessary for the formation of two carboxyl groups, separating the trihexosan-di-carboxylic acid thus produced in the form of its sparingly soluble basic barium salt, redissolving said salt with an acid, and separating the trihexosan-di-carboxylic acid in the form of its easily soluble neutral calcium salt.

14. Process for the manufacture of the calcium salt of trihexosan-mono-carboxylic acid, comprising treating trihexosan in alkaline solution with that quantity of an oxidizing agent which is necessary for the formation of one carboxyl group, separating the trihexosan-mono-carboxylic acid thus produced in the form of its sparingly soluble basic barium salt, redissolving said salt with an acid, and separating the trihexosan-mono-carboxylic acid in the form of its easily soluble neutral calcium salt.

15. The metal salts of trihexosan-carboxylic acids.

16. The metal salts of trihexosan-di-carboxylic acid.

17. The metal salts of trihexosan-mono-carboxylic acid.

18. The light metal salts of the trihexosan-di-carboxylic acid.

19. The calcium salt of the trihexosan-di-carboxylic acid.

20. The calcium salt of the trihexosan-mono-carboxylic acid.

MARJA FINKELSZTEJN.